United States Patent Office 2,852,580
Patented Sept. 16, 1958

2,852,580

PREPARATION OF POLYISOOLEFINS

Edward M. Geiser, Downers Grove, Ill., assignor to Universal Oil Products Company, Des Plaines, Ill., a corporation of Delaware No Drawing. Application September 26, 1955
Serial No. 536,764

12 Claims. (Cl. 260—683.15)

This invention relates to an improved process for the polymerization of a mono-iso-olefin and more particularly to a process for polymerizing isobutylene.

Synthetic liquid hydrocarbon drying oils capable of producing a coating film having a remarkable degree of hardness, toughness, and immunity to deterioration upon continuous exposure to sunlight, high and low temperature, and moisture may be prepared by polymerizing a mono-iso-olefin at a moderately low temperature in the presence of a catalyst. The rigid control of temperature during the formation of the polymer is considered a critical factor in obtaining the desired and preferred liquid product inasmuch as this factor is believed to determine the manner in which the monomer condenses to form the product. The fundamentally different reaction mechanism involved in the formation of an insoluble solid polymer product as distinguished from the liquid product here obtained is based on the fact that polymerization of the mono-iso-olefin in the conditions specific in the present process is believed to proceed linearly; while in the case of the process in which insoluble solid polymers are obtained a great deal of cross-polymerization is obtained. The temperature of the reaction mixture, particularly at the point of the polymer formation, is a factor of especial importance in limiting the weight of the product to linear product monomers of intermediate size. The control of this vital factor is effected in the present process by an internal refrigerant which adsorbs a large quantity of heat liberated by the highly exothermic reaction at the point of polymer formation.

An alternative arrangement for external refrigerating the reaction mixture accompanied by rapid and thorough mixing of the monomer charge stock at the point of introducing the polymerization catalyst may likewise be employed, although said method is not the generally preferred method of conducting the reaction due to the much greater difficulty of maintaining the desired low temperature at the point of polymerization within the reaction mixture. This problem is usually associated with the difficulty of maintaining sufficient thorough mixing to disperse the catalyst and the reactants throughout the entire mass of the reaction mixture and to obtain rapid and efficient heat transfers from the external refrigerant to the centers of the polymerization whereby cross-polymerization with the resultant formation of insoluble solid polymers as well as conjunct polymerization may be prevented. The internal refrigerant which is utilized in this reaction is preferably a solvent and a diluent for the reaction mixture and therefore will also act in the capacity as a dispersing agent, thereby further aiding in the control of the reaction temperature by controlling the rate of reaction and, hence the rate of liberation of the exothermic heat of polymerization. In the present method of polymerizing a mono-iso-olefin the internal refrigerant which is used to control the rate of reaction comprises a low molecular weight paraffin such as ethane, propane, butane, etc., the reaction usually taking place at a temperature of from about $-100°$ to about $-40°$ C.

It is therefore an object of this invention to provide a controlled reaction for the preparation of liquid hydrocarbon drying oils.

A further object of this invention is to provide a method for controlling the reaction temperature of the polymerization of a mono-iso-olefin whereby linear polymerization of the monomer is effected with a corresponding decrease in the possibility of cross-polymerization accompanied by the resultant formation of insoluble solid polymers.

One embodiment of this invention resides in a process for preparing a poly-iso-olefin by polymerizing a mono-iso-olefin in an N,N-dialkylamide in the presence of a polymerization catalyst, and recovering the resultant poly-iso-olefin.

A specific embodiment of this invention is found in a process for preparing polyisobutylene by polymerizing isobutylene in an N,N-dialkylamide in the presence of boron trifluoride at a temperature in the range of from about $0°$ to about $-40°$ C., and recovering the resultant polyisobutylene.

A more specific embodiment of the invention is found in a process for preparing polyisobutylene by polymerizing isobutylene in an N,N-dimethylformamide in the presence of boron trifluoride at a temperature in the range of from about $0°$ to about $-40°$ C., and recovering the resultant polyisobutylene.

Other objects and embodiments referring to alternative N,N-dialkylamides and to alternative mono-iso-olefins will be found in the following further detailed description of the invention.

As hereinbefore mentioned it is now proposed that the temperature at which polymerization of a mono-iso-olefin occurs may be controlled by the use of a solvent comprising an N,N-dialkylamide, said solvent acting as both an internal refrigerant and as a diluent for the reaction mixture. Examples of these dialkylamides which may be used include N,N-methylformamide, N,N-ethylformamide, N,N-propylformamide, N,N-methylacetamide, N,N-ethylacetamide, N,N-propylacetamide, etc. As previously stated the temperature of the reaction must be maintained in the range of from about $0°$ to about $-40°$ C., in order to obtain the desired linear polymerization rather than cross-polymerization in order that a liquid unsaturated hydrocarbon oil rather than a resinous or solid cross-polymer is formed. For example, when no internal refrigerant is used a temperature of approximately $-95°$ C. is required in order to obtain a highly elastic semi-solid rubber-like material having a molecular weight of about 250,000, whereas the addition of an N,N-dialkylamide will allow the reaction to be run at a much higher temperature while obtaining the same product. The use of di-alkylamide in this reaction allows said reaction to proceed at a relatively higher temperature than hereinbefore used in similar polymerization processes, that is, temperatures in the range of from about $0°$ to about $-40°$ C., when using a dialkylamide solvent, will result in the formation of linear polymers of the desired type. In the absence of such a solvent, the reaction temperatures above $-40°$ C. will allow a significant proportion of the monomers to polymerize to form a solid cross-polymer which will appear in great degree in admixture with the desired liquid polymers, or else the entire product may be of the solid variety. The tendency to form the solid polymers will increase as the reaction temperature increases, until such point is reached where the linear polymerization ceases and the undesirable conjunct polymerization begins. In addition using a solvent, of the type hereinbefore set forth, in the reaction will result in a saving in the cost of the refrigerants and will permit the reaction to proceed in a relatively calm and even manner as contrasted to the violent and highly exothermic nature of the reaction when an internal refrigerant of the N,N-dialkylamide type is omitted.

The mono-iso-olefin hydrocarbon reactants utilized in the present process are selected from the class of hydrocarbons containing preferably not more than 8 carbon atoms per molecule in order to obtain the desirable reactivity and to obtain the product desired in the reaction. The desired product would generally not be obtained were higher molecular mono-iso-olefins utilized from which polymers would result having a relatively high proportion of hydrocarbons in the chain saturated with hydrogen or alkyl radicals derived from the saturated portion of the molecule charged to the reaction. Although isobutylene (2-methylpropene) is generally preferred as the mono-iso-olefin reactant utilizable in the present process because of its availability and because it is the lowest molecular weight member of the series, other homologous members of the series such as 2-methylbutene-1, 3-methylbutene-1, 2-ethylbutene-1, 2,3-dimethylbutene-1, 2 - methylpentene - 1, 3-methylpentene-1, 2,3-dimethylpentene-1, 2-methylhexene-1, 3 - methylhexene-1, etc., may likewise be utilized as the mono-iso-olefin reactant. Although iso-olefins containing terminal methylene groups are preferred, those lacking such groups such as, for example 2-methylbutene-3, 2-ethylbutene-2, 2-methylpentene-2, etc., may also be used under conditions modified to compensate for their somewhat lesser activity. Furthermore, mono-iso-olefins found in the $C_4$-$C_6$ fraction of the product of a thermal cracking reaction employing petroleum as a charging stock may be used in this reaction. Another suitable source of the mono-iso-olefin reactant is an appropriately boiling fraction or selected portion of propylene and butylene polymers or interpolymers such as a hexene to octene fraction of a codimer gasoline product. Further, it is possible to use, instead of the iso-olefins themselves, corresponding tert-alkyl-fluorides which, in a hydrogen fluoride-containing system, are equivalent in reactivity to the iso-olefins themselves, and may in a sense, be considered iso-olefin donors.

The polymerization of the mono-iso-olefin reactant is effected in the presence of a polymerization catalyst such as boron trifluoride. Another catalyst which may be used in this process comprises substantially anhydrous hydrogen fluoride containing less than about 10% by weight thereof of water. The use of substantially anhydrous hydrogen fluoride as a catalyst in the present polymerization reaction provides certain advantages in the recovery of the desired polymer product therein preventing the undersirable deterioration of said product during the recovery operation. Thus, hydrogen fluoride may be recovered for reuse from the catalyst-polymer complex without deleterious effects upon the product by an inexpensive and simple method hereinafter described in detail. If Friedel-Crafts metal halide catalysts such as aluminum chloride, for example, are used in the reaction, they must be separated from the reaction products by washing with an active solvent such as alcohol or water. In the case of water, the aqueous phase of the hydrolyzed reaction mixture contains chemically hydrolyzed or hydrated aluminum chloride which cannot be readily treated to recover the anhydrous catalyst for recycling purposes. In the event that alcohol is used, the catalyst is similarly solvated.

The catalyst is introduced gradually into the reaction mixture containing the mono-iso-olefin and the solvent, preferably in small quantities as the reaction proceeds. If so desired the hydrogen fluoride may be added to the reaction mixture as a liquid or in gaseous form, while the boron trifluoride may be introduced in gaseous form. When the catalysts are introduced as a gas they are bubbled into the mixture as a suspension or mixture with an inert diluent gas such as nitrogen or gaseous hydrocarbons. The reaction mixture at the point of inlet of the catalyst is thoroughly agitated to obtain uniform distribution of the catalyst throughout the mixture of the reactants contacted, the total quantity of hydrogen fluoride or boron trifluoride introduced being from about 5% to about 25% of the weight of the mono-iso-olefin present. Below about 5% by weight of the reactant the quantity of hydrogen fluoride or boron trifluoride is generally insufficient to convert, in adequate yield, the monomer charged to the process to polymers thereof. Above about 25% by weight of the monomers the additional quantity of catalyst effects no useful purposes in completing or extending the polymerization reaction.

Following completion of the desired degree of polymerization after the addition of from about 5% to about 25% by weight of the reactant of hydrogen fluoride to the reaction mixture, the hydrocarbon must be separated from the catalyst. The catalyst may be removed from the mixture by the addition of water, aqueous hydrogen fluoride, or aqueous solutions of sodium hydroxide, potassium hydroxide, ammonia, etc., after which the aqueous phase is separated from the polymer. While such a procedure is often convenient and produces a satisfactory hydrocarbon product, the catalyst is not recovered in condition for reuse, except in the case of aqueous hydrogen fluoride from which the anhydrous acid may be distilled in part. Other methods of catalyst removal which circumvent this difficulty will be subsequently described in greater detail. Certain oxygen-containing compounds such as alcohols, esters, ethers, phenols, etc., combine with the hydrogen fluoride to form complexes and free the polymer product. In a similar manner, certain inorganic salts such as sodium fluoride, potassium fluoride, and others combine with hydrogen fluoride to form double salts; anhydrous ammonia and the amines, and alkanol amines, which form amine hydrofluoride salts by reaction with the hydrogen fluoride in the reaction mixture, particularly the high boiling amines such as aniline, pyridine, quinoline, declyamine and their homologs, the hydrogen fluoride salts of which may be heated to recover not only the organic amine for recycle purposes, but the hydrogen fluoride as well in an anhydrous state for recycle to the polymerization stage of the process.

The above materials which combine with hydrogen fluoride and release the polymer oils therefrom may be designated collectively as "bases," where the term "base" as utilized herein characterizes a class of materials having the general properties of being capable of combining with an acid to form a complex therewith or a neutral salt thereof.

In order to promote the separation between the polymer product and other components of the reaction mixture, particularly the product formed by the reaction of the base with the hydrogen fluoride catalyst, a low boiling naphtha diluent or other mixture of hydrocarbons containing a large percentage of aromatic hydrocarbons such as benzene, toluene, xylene, etc., may be added to the reaction mixture following the addition of the base, the polymer product dissolving in the naphtha solvent or other aromatic hydrocarbon solvent to form a separate phase which may be decanted from the remaining reaction mixture.

In accordance with a further alternative method of recovering the hydrogen fluoride catalyst from the polymerization reaction mixture phase and simultaneously effecting the recovery of the polymer product, the reaction mixture obtained upon completion of the polymerization reaction may be heated or otherwise distilled to vaporize the hydrogen fluoride or boron trifluoride from the other components of the reaction mixture. The distillation is preferably effected rapidly, for example, by flash distillation of the mixture in a distillation apparatus at normal or sub-atmospheric pressure. Further, this distillation may be carried out more efficiently in the presence of a decomposition catalyst selected from such metals and their alloys as copper, cobalt, nickel, lead, tin, and silver. The hydrogen fluoride may also be flashed therefrom by introducing the polymerization reaction mixture into a low boiling hydrocarbon naphtha maintained at a temperature of from about 50° to about 150° C., and permitting the hydrogen fluoride to flash distill from the mixture. The polymer product is thereafter recovered from its solution with the naphtha diluent and/or internal refrigerant, comprising in this case, an N,N-dialkylamide, by a low temperature distillation procedure which may be effected at sub-atmospheric pressures in order to lower the temperature and thereby prevent deterioration by further polymerization of the polymer product. The mixture, prior to distillation, may be washed successively with several portions of water or dilute caustic to remove any residual hydrogen fluoride which would adversely affect the product during the distillation.

The polymer product as recovered in accordance with the above procedure is a light-colored viscous, saturated hydrocarbon oil having molecular weights from about 300 to about 10,000 or more. It dries rapidly, especially in the presence of metallic driers such as cobalt naphthenate, cobalt oleate and other well-known drier salts, particularly those of lead and manganese, upon exposure in thin films to atmospheric oxygen. When subjected to oxidative drying, a film of the polymer oil becomes tack-free in less than about 8 hours and dries to a completely non-tacky film to form a film of extreme hardness (having Sward hardness values of from about 45 to about 75) which are also tough, and highly resistant to abrasion. The dried films thereby obtained are moisture and alkali resistant and do not discolor upon exposure to ultra-violet radiation. The desirable drying characteristics of the polymer product of this invention renders the same particularly useful in the formulation of protective and decorative coatings such as paints, varnishes, lacquers, etc., as a component in the formulation of printing ink compositions of the oxidative drying type. In addition the liquid hydrocarbon oils formed in this process may be used in components of rubber compositions to improve the resistance of said rubber to acids and to ozone, or additives to motor oils, greases and lubricants to increase viscosity and to improve properties, and in adhesives.

The following examples are given to illustrate the process of this invention which, however, are not intended to limit the generally broad scope of the present invention in strict accordance therewith.

*Example I*

A stainless steel reactor equipped with a mechanical stirrer, a Dry Ice condenser, a thermocouple well, and a hydrocarbon and catalyst inlet tube is immersed in a Dry Ice-acetone bath, cooled to approximately —20° C. and charged with 108 g. of isobutylene and 50 g. of N,N-dimethylformamide. The mixture is vigorously stirred and 20 g. of boron trifluoride is slowly bubbled into the mixture. The reaction mixture is continually stirred for an additional hour after which the reactor and contents thereof are allowed to warm to room temperature. The unreacted gases are vented, the reactor opened and the mixture neutralized with sodium hydroxide and thoroughly washed with distilled water. A viscous copolymer oil, comprising polyisobutylene, is recovered.

*Example II*

A reactor described in Example I is cooled to approximately —40° C. and charged with 108 g. of isobutylene and 50 g. of N,N-dimethylformamide. 30 g. of hydrogen fluoride are slowly added with stirring to the reaction mixture which is vigorously stirred for an additional period of 2 hours after which time the reactor and contents thereof are allowed to warm to room temperature. The unreacted gases are recovered, the reactor opened, and the reaction product is neutralized with sodium hydroxide and washed with distilled water. A viscous copolymer oil comprising polyisobutylene is separated from the reaction mixture.

I claim as my invention:

1. A process for the preparation of a polyisoolefin which comprises polymerizing a mono-iso-olefin in an N,N-dialkylamide at a temperature of from about 0° to about —40° C. in the presence of a polymerization catalyst selected from the group consisting of boron trifluoride and hydrogen fluoride, and recovering the resultant polyiso-olefin.

2. A process for the preparation of polyisobutylene which comprises polymerizing isobutylene in an N,N-dialkylamide in the presence of a polymerization catalyst selected from the group consisting of boron trifluoride and hydrogen fluoride at a temperature in the range of from about 0° to about —40° C., and recovering the resultant polyisobutylene.

3. A process for the preparation of polyisobutylene which comprises polymerizing isobutylene in an N,N-dialkylamide in the presence of boron trifluoride at a temperature in the range of from about 0° to about —40° C., and recovering the resultant polyisobutylene.

4. A process for the preparation of polyisobutylene which comprises polymerizing isobutylene in N,N-dimethylformamide in the presence of boron trifluoride at a temperature in the range of from about 0° to about —40° C., and recovering the resultant polysiobutylene.

5. A process for the preparation of polyisobutylene which comprises polymerizing isobutylene in N,N-diethylformamide in the presence of boron trifluoride at a temperature in the range of from about 0° to about —40° C., and recovering the resultant polyisobutylene.

6. A process for the preparation of polyisobutylene which comprises polymerizing isobutylene in N,N-dimethylacetamide in the presence of boron trifluoride at a temperature in the range of from about 0° to about —40° C., and recovering the resultant polyisobutylene.

7. In a process for the preparation of polyisobutylene which comprises polymerizing isobutylene in the presence of a polymerization catalyst selected from the group consisting of boron trifluoride and hydrogen fluoride at a temperature in the range of from about 0° to about —40° C., the improvement which comprises dissolving said isobutylene in an N,N-dialkylamide before contact with said catalyst.

8. In a process for the preparation of polyiso-olefin which comprises polymerizing mono-iso-olefin in the presence of boron trifluoride at a temperature in the range of from about 0° to about —40° C., the improvement which comprises dissolving said mono-iso-olefin in an N,N-dialkylamide before contact with said boron trifluoride.

9. In a process for the preparation of polyisobutylene which comprises polymerizing isobutylene in the presence of boron trifluoride at a temperature in the range of from about 0° to about —40° C., the improvement which comprises dissolving said isobutylene in an N,N-dialkylamide before contact with said boron trifluoride.

10. In a process for the preparation of polyisobutylene which comprises polymerizing isobutylene in the presence of boron trifluoride at a temperature in the range of from about 0° to about —40° C., the improvement which comprises dissolving said isobutylene in N,N-dimethylformamide before contact with said boron trifluoride.

11. In a process for the preparation of polyisobutylene which comprises polymerizing isobutylene in the presence of boron trifluoride at a temperature in the range of from about 0° to about —40° C., the improvement which comprises dissolving said isobutylene in N,N-diethylformamide before contact with said boron trifluoride.

12. In a process for the preparation of polyisobutylene which comprises polymerizing isobutylene in the presence of boron trifluoride at a temperature in the range of from about 0° to about −40° C., the improvement which comprises dissolving said isobutylene in N,N-dimethylacetamide before contact with said boron trifluoride.

References Cited in the file of this patent

UNITED STATES PATENTS

| | | |
|---|---|---|
| 2,690,417 | Shalit et al. | Sept. 28, 1954 |
| 2,709,642 | Mann et al. | May 31, 1955 |